United States Patent
Daniels et al.

(10) Patent No.: US 9,580,562 B2
(45) Date of Patent: Feb. 28, 2017

(54) ADHESIVE COMPOSITIONS, ADHESIVE ARTICLES AND METHODS FOR MAKING THE SAME

(71) Applicant: 3M INNOVATIVE PROPERTIES COMPANY, St. Paul, MN (US)

(72) Inventors: Michael P. Daniels, Inver Grove Heights, MN (US); James D. LaPerre, River Falls, WI (US); Scott R. Meyer, Woodbury, MN (US); Jay M. Jennen, Forest Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 86 days.

(21) Appl. No.: 14/186,135

(22) Filed: Feb. 21, 2014

(65) Prior Publication Data

US 2014/0171538 A1 Jun. 19, 2014

Related U.S. Application Data

(60) Continuation of application No. 13/546,279, filed on Jul. 11, 2012, now abandoned, which is a division of application No. 12/304,186, filed as application No. PCT/US2007/071551 on Jun. 19, 2007, now abandoned.

(60) Provisional application No. 60/815,078, filed on Jun. 20, 2006.

(51) Int. Cl.
  *C08J 3/28* (2006.01)
  *C09J 133/04* (2006.01)
  *C08L 33/04* (2006.01)

(52) U.S. Cl.
  CPC ............... *C08J 3/28* (2013.01); *C09J 133/04* (2013.01); *C08L 33/04* (2013.01); *C08L 2205/02* (2013.01); *Y10T 428/2848* (2015.01)

(58) Field of Classification Search
  CPC .... C08J 3/28; Y01T 428/2848; C09J 133/041
  See application file for complete search history.

(56) References Cited

U.S. PATENT DOCUMENTS

| | | | |
|---|---|---|---|
| 5,100,963 | A | 3/1992 | Lin |
| 5,393,787 | A | 2/1995 | Nestegard et al. |
| 5,599,872 | A | 2/1997 | Sulewski |
| 6,103,152 | A | 8/2000 | Gehlsen et al. |
| 6,204,350 | B1 | 3/2001 | Liu et al. |
| 6,231,962 | B1 | 5/2001 | Bries et al. |
| 6,503,621 | B1 | 1/2003 | Ma et al. |
| 6,608,143 | B1 | 8/2003 | Fukuoka |
| 6,630,531 | B1 | 10/2003 | Khandpur et al. |
| 6,780,484 | B2 | 8/2004 | Kobe et al. |
| 6,805,933 | B2 | 10/2004 | Patel et al. |
| 6,835,422 | B2 | 12/2004 | Kobe et al. |
| 2002/0004130 | A1 | 1/2002 | Lhila |
| 2004/0019170 | A1 | 1/2004 | Ohrui et al. |
| 2004/0249076 | A1 | 12/2004 | Slark |
| 2005/0014879 | A1 | 1/2005 | Moroishi et al. |
| 2005/0239965 | A1 | 10/2005 | Kim et al. |
| 2006/0121248 | A1 | 6/2006 | Lorenz et al. |

FOREIGN PATENT DOCUMENTS

| | | |
|---|---|---|
| JP | 2001-164221 | 6/2001 |
| JP | 2002-372619 | 12/2002 |
| WO | WO 2004-111102 | 12/2004 |

OTHER PUBLICATIONS

European Search Report from EP Patent No. 07 78 4482, dated Jun. 24, 2010.

*Primary Examiner* — Sanza McClendon
(74) *Attorney, Agent, or Firm* — Thomas M. Spielbauer; Dena Ehrich; Philip Y. Dahl

(57) ABSTRACT

Adhesive compositions comprising a high molecular weight acrylic copolymer and a low molecular weight copolymer are disclosed. Adhesive articles and methods of making adhesive compositions and articles are also described.

3 Claims, 5 Drawing Sheets

ADHESIVE COMPOSITIONS, ADHESIVE ARTICLES AND METHODS FOR MAKING THE SAME

FIELD

The present disclosure relates to adhesive compositions comprising a high molecular weight acrylic copolymer and a low molecular weight acrylic copolymer.

SUMMARY

In one aspect, the present disclosure is directed to adhesive compositions comprising a blend of a first acrylic copolymer and a second acrylic copolymer. In one exemplary embodiment, the adhesive article comprises a blend of a first acrylic copolymer resulting from polymerization of monomers A and B, wherein (i) the first acrylic copolymer has a number average molecular weight, $M_n$, of at least about 150,000 (or a weight average molecular weight, $M_w$, of at least about 450,000), and (ii) monomer B has at least one reactive group that is capable of hydrogen bonding. The second acrylic copolymer results from polymerization of monomers C and D, wherein (i) the second acrylic copolymer has a number average molecular weight, $M_n$, of less than about 70,000 (or a $M_w$ less than about 100,000), (ii) monomer D has at least one reactive group that is capable of hydrogen bonding, and (iii) the second acrylic copolymer comprises greater than about 10 parts by weight (pbw) of monomer D based on a total weight of the second acrylic copolymer. In some embodiments, the pbw of monomer D in the second acrylic copolymer is greater than the pbw of monomer B in the first acrylic copolymer. In some embodiments, the pbw of monomer D in the second acrylic copolymer is at least about 3 pbw greater than the pbw of monomer B in the first acrylic copolymer.

In a further exemplary embodiment of the present disclosure, the adhesive article comprises a blend of (1) a first acrylic copolymer formed from monomers A and B, wherein the first acrylic copolymer (i) has a number average molecular weight, $M_n$, of at least about 150,000 (or a $M_w$ of at least about 450,000) and (ii) comprises less than about 10 percent by weight (pbw) of monomer B based on a total weight of the first acrylic copolymer, wherein monomer B has at least one reactive group that is capable of hydrogen bonding; and (2) a second acrylic copolymer formed from monomers C and D, wherein the second acrylic copolymer (i) has a number average molecular weight, $M_n$, of less than about 70,000 (or a $M_w$ less than about 100,000) and (ii) comprises greater than about 10 pbw of monomer D based on a total weight of the second acrylic copolymer.

In yet a further exemplary embodiment of the present disclosure, the adhesive article comprises an adhesive foam layer comprising a mixture of a first acrylic copolymer and a second acrylic copolymer, wherein the first acrylic copolymer (i) is formed from monomers A and B, wherein monomer B has at least one reactive group that is capable of hydrogen bonding, (ii) has a number average molecular weight, $M_n$, of at least about 150,000 (or a $M_w$ of at least about 450,000) and (iii) comprises less than about 10.0 percent by weight (pbw) of monomer B based on a total weight of the first acrylic copolymer; and the second acrylic copolymer (i) is formed from monomers B and C, (ii) has a number average molecular weight, $M_n$, of less than about 70,000 (or a $M_w$ of less than about 100,000) and (iii) comprises a percent by weight (pbw) of monomer B based on a total weight of the second acrylic copolymer, wherein the pbw of monomer B of the second acrylic copolymer is greater than the pbw of monomer B of the first acrylic copolymer.

In another aspect, the present disclosure provides adhesive articles comprising one or more adhesive core layers and, optionally, one or more additional layers. In one exemplary embodiment of the present disclosure, the adhesive article comprises (a) an adhesive core layer comprising the above-described blend or mixture of a first acrylic copolymer having a relatively high molecular weight and a second acrylic copolymer having a relatively low molecular weight; and (b) at least one additional layer on a major surface of the adhesive core layer. The adhesive article of the present disclosure may further comprise other layers including, but not limited to, a second adhesive layer, such as a pressure-sensitive adhesive layer and/or a heat-activatable adhesive layer, at least one release liner, at least one non-adhesive substrate layer, or any combination thereof.

In another aspect, the present disclosure is further directed to methods of making adhesive articles. In one exemplary embodiment, the method of making an adhesive article comprises the steps of extruding a blend of (1) a first acrylic copolymer formed from monomers A and B, wherein the first acrylic copolymer (i) has a number average molecular weight, $M_n$, of at least about 150,000 (or a $M_w$ of at least about 450,000) and (ii) comprises less than about 10 percent by weight (pbw) of monomer B based on a total weight of the first acrylic copolymer, wherein monomer B has at least one reactive group that is capable of hydrogen bonding; and (2) a second acrylic copolymer formed from monomers C and D, wherein the second acrylic copolymer (i) has a number average molecular weight, $M_n$, of less than about 70,000 (or a $M_w$ of less than about 100,000) and (ii) comprises greater than about 10 pbw of monomer D based on a total weight of the second acrylic copolymer; and exposing the extrudate to an amount of irradiation so as to obtain a controlled degree of crosslinking between the first acrylic copolymer and the second acrylic copolymer. Desirably, the controlled degree of crosslinking between the first acrylic copolymer and the second acrylic copolymer results in a crosslinked adhesive article having a stress relaxation ratio $G(300)/G(0.1)$ as measured by a Stress Relaxation Test at 70° C. of less than or equal to about 0.30, desirably, from about 0.13 to about 0.30.

In another exemplary embodiment, the method of making an adhesive article comprises providing an electron beam generating apparatus having a first control for an accelerating voltage and a second control for a dose; providing a material to be cured having a composition, a thickness, and a density; determining one or more desired properties capable of resulting from a controlled amount of crosslinking using the electron beam generating apparatus; and using a Minimum Calculated Core Cure value of the material based on dose-depth profile calibration curves for the electron beam generating apparatus and for the material to be cured, crosslinking the material at a voltage and dose that results in the one or more desired properties. The exemplary method may further comprise preparing the dose-depth profile calibration curves for the electron beam generating apparatus and for the material to be cured based on the composition, thickness, and density of the material; and determining the Minimum Calculated Core Cure value based on the dose-depth profile calibration curves.

These and other features and advantages of the present disclosure will become apparent after a review of the following detailed description of the disclosed embodiments and the appended claims.

DETAILED DESCRIPTION

Figure 1:
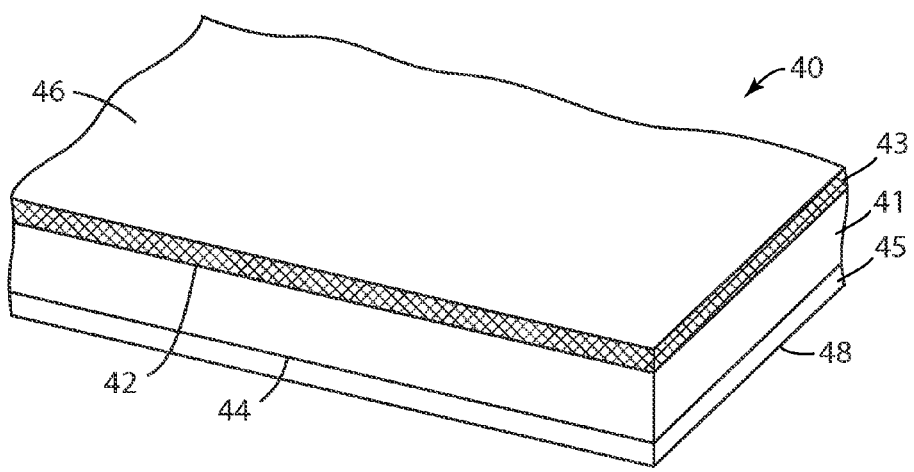
FIG. 1 is a cross-sectional view of an exemplary adhesive article according to some embodiments of the present disclosure.

Generally, the adhesive compositions of the present disclosure comprise a mixture of a high molecular weight acrylic copolymer and a low molecular weight acrylic copolymer. In some embodiments, the adhesive compositions may optionally further comprise one or more additional components as described below.

The high molecular weight acrylic copolymer is also referred to herein as the "first acrylic copolymer." The first acrylic copolymer is formed from monomer(s) A and monomer(s) B. As used herein, the term "monomer(s)" indicates that one or more monomers may be selected. For example, "monomer(s) A" may include one or more monomers selected from those monomers suitable for use as a monomer A. Similarly, "monomer(s) B" refers to the one or more monomers selected from those monomers suitable for use as a monomer B.

Suitable monomers for monomer A include, but are not limited to, acrylic or methacrylic esters of non-tertiary alkyl alcohols, with the alkyl groups having from 1 to 20 carbon atoms (for example, from 3 to 18 carbon atoms). Such monomers A include, but are not limited to, methyl (meth) acrylate, ethyl (meth)acrylate, n-butyl (meth)acrylate, lauryl (meth)acrylate, 2-ethylhexyl (meth)acrylate, cyclohexyl (meth)acrylate, isooctyl (meth)acrylate, octadecyl (meth) acrylate, tridecyl (meth)acrylate, nonyl (meth)acrylate, decyl (meth)acrylate, dodecyl (meth)acrylate, isobornyl (meth)acrylate, 2-phenoxyethyl (meth)acrylate, benzyl (meth)acrylate, n-hexyl (meth)acrylate, n-octyl (meth)acrylate, phenyl (meth)acrylate, or any combination thereof. As used herein, the term "(meth)acrylate" is used to refer to either one or both of the acrylate and methacrylate species. For example, methyl (meth)acrylate refers to methyl acrylate, methyl methacrylate, and combinations thereof.

Suitable monomers for monomer B include, but are not limited to, acrylic, methacrylic, or other unsaturated acids with the alkyl group having from 1 to 20 carbon atoms (for example, from 3 to 18 carbon atoms). Such monomers B include, but are not limited to, acrylic acid, methacrylic acid, itaconic acid, citraconic acid, maleic acid, fumaric, acid, and itaconic, citraconic, maleic and fumaric monoesters (these are diacid compounds and their monoester offer an acid group), or any combination thereof. Other suitable monomers B include acrylonitrile, methacrylonitrile, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl (meth)acrylate, N,N-diethylacrylamide, vinylidene chloride, styrene, vinyl toluene, hydroxyarylacryaltes, tetrahydrofurfuryl(meth) acrylate, and alkyl vinyl ethers.

In some embodiments, at least one monomer B comprises a monomer having at least one reactive group thereon that is capable of hydrogen bonding (for example, —COOH).

In some embodiments, the first acrylic copolymer comprises less than about 10 percent by weight (pbw) of monomer(s) B based on a total weight of the first acrylic copolymer. In some embodiments, the first acrylic copolymer comprises from about 2 to about 7 pbw of monomer(s) B based on a total weight of the first acrylic copolymer.

The high molecular weight acrylic copolymer component (or first acrylic copolymer) may be formed using conventional polymerization techniques. These techniques are generally known in the industry and include processes such as thermally initiated polymerization, photoinitiation, suspension polymerization, and the like. Typically, in addition to monomer(s) A and monomer(s) B, an appropriate polymerization initiator can be used to initiate polymerization of monomers A and B. Suitable initiators for photoinitiation include, but are not limited to, 2,2-dimethoxy-2-phenylacetophenone (for example, IRGACURE™ 651 commercially available from Ciba-Geigy (Hawthorne, N.Y.)); 2-hydroxy-1-(4-*2-hydroxyethoxy)phenyl)-2-methyl-1propanone (for example, DAROCURE™ 2959 commercially available from Ciba-Geigy); 2-hydroxy-2-methyl-1-phenyl-1-propanone (for example, DAROCURE™ 1173 commercially available from Ciba-Geigy); diphenyl (2,4,6-trimethylbenzoyl)-phosphine oxide (for example, LUCIRIN™ TPO commercially available from BASF Corporation (Florham Park, N.J.)); 1-hydroxycyclohexyl phenyl ketone (for example, IRGACURE™ 184 commercially available from Ciba-Geigy); 2-methyl-1-(4-(methylhio)phenyl)-2-(4-morpholinyl)-1-propanone (for example, IRGACURE™ 907 commercially available from Ciba-Geigy); 2-benzyl-2-(dimethylamino)-1-(4-(4-morpholinyl)phenyl)-1-butanone (for example, IRGACURE™ 369 commercially available from Ciba-Geigy); phenylbis (2,4,6-trimethyl benzoyl)-phosphine oxide (for example, IRGACURE™ 819 commercially available from Ciba-Geigy), or ethyl 2,4,6-trimethylbenzoylphenylphosphinate (for example, LUCIRIN™ TPO-L commercially available from BASF Corporation).

Further, a chain transfer agent may be present during the polymerization reaction. Chain transfer agents may be used to control the molecular weight of the resulting polymer and reduce the amount of residual monomer remaining after the polymerization reaction. Suitable chain transfer agents include, but are not limited to, isooctyl thioglycolate (IOTG) (for example, IOTG commercially available from Daicel Chemical Industries, LTD (Tokyo, JAPAN) or from Dow Chemical Company (Midland, Mich.)); n-octyl mercaptan (for example, commercially available from Arkema (Philadelphia, Pa.); n-decyl mercaptan (for example, commercially available from Philips Petroleum (Houston, Tex.)); n-hexyl mercaptan (for example, commercially available from Arkema); n-octadecyl mercaptan (for example, commercially available from ACIMA Chemical Industries (Philadelphia, Pa.)); n-dodecyl mercaptan (for example, commercially available from Arkema); tert-dodecyl mercaptan (for example, commercially available from Arkema); and 2-ethylhexyl thioglycolate (for example, commercially available from Arkema).

In some embodiments, the first acrylic copolymer has a number average molecular weight, $M_n$, of at least about 150,000. In some embodiments, the first acrylic copolymer has a weight average molecular weight, $M_w$, of at least about 450,000. As used herein, number average molecular weight, $M_n$, and weight average molecular weight, $M_w$, are measured using the Gel Permation Chromatography (GPC) test method described in the "Test Methods" section below.

In some embodiments, the first acrylic copolymer has a $M_n$ ranging from about 150,000 to about 600,000 (and/or a $M_w$ of at least about 450,000 to about 2,000,000). In some embodiments, the first acrylic copolymer has a $M_n$ ranging from about 160,000 to about 350,000 (and/or a $M_w$ of at least about 480,000 to about 1,000,000) and in some embodiments, a $M_n$ from about 170,000 to about 300,000 (and/or a $M_w$ of at least about 500,000 to about 900,000).

Generally, the first acrylic copolymer may be present in an amount that varies depending on the desired properties of the resulting adhesive composition. Typically, the first acrylic copolymer is present in an amount greater than about 50 percent by weight (pbw) based on a total weight of the adhesive composition. In some embodiments, the first acrylic copolymer is present in an amount greater than about 60, greater than about 65, or even greater than about 70 pbw. In some embodiments, the first acrylic copolymer is present in an amount ranging from about 75 to about 98 pbw, based on a total weight of the adhesive composition.

Adhesive compositions according to the present disclosure further comprise a low molecular weight acrylic copolymer, also referred to herein the "second acrylic copolymer." The second acrylic copolymer is formed from monomer(s) C and monomer(s) D. Suitable monomers for monomer C are the same as those suitable for monomer A, and are described above with respect to the first acrylic copolymer. Similarly, suitable monomers for monomer D are the same as those suitable for monomer B, as described above with respect to the first acrylic copolymer.

Generally, each of the monomer(s) A, B, C, and D are independently selected. In some embodiments, one or more of the monomers selected for use as monomer(s) A may also be selected for use as monomer(s) C. Similarly, in some embodiments, one or more monomers selected for use as monomer(s) B may also be selected for use as monomer(s) D.

In some embodiments, the second acrylic copolymer comprises greater than about 10 pbw of monomer(s) D based on a total weight of the second acrylic copolymer. In some embodiments, the second acrylic copolymer comprises from about 12 to about 30 pbw of monomer(s) D, and, in some embodiments, from about 15 to about 20 pbw of monomer(s) D, based on a total weight of the second acrylic copolymer.

Typically, the pbw of monomer(s) D of the second acrylic copolymer is greater than the pbw of monomer(s) B of the first acrylic copolymer. In some embodiments, the pbw of monomer(s) D of the second acrylic copolymer is at least 3 pbw greater than the pbw of monomer(s) B of the first acrylic copolymer. In other embodiments, the pbw of monomer(s) D of the second acrylic copolymer is at least 5 pbw (or at least 8 pbw, or at least 10 pbw, or at least 12 pbw, or at least 15 pbw) greater than the pbw of monomer(s) B of the first acrylic copolymer.

In some embodiments, at least one monomer C of the second acrylic copolymer is identical to at least one monomer A of the first acrylic copolymer. In some embodiments, all of the monomer(s) C of the second acrylic copolymer are the same as the monomer(s) A of the first acrylic copolymer. In other embodiments, each monomer C of the second acrylic copolymer differs from all of the monomer(s) A of the first acrylic copolymer.

In some embodiments, the second acrylic copolymer is substantially free of "photoinitiator monomers," that is, (i) monomers containing reactive groups that are susceptible to forming radicals in the presence of a photoinitiator and (ii) monomers, which are themselves photoactive radical formers. In such an exemplary embodiment, the second acrylic copolymer is formed from monomers C and D, and possibly additional monomers, as long as the additional monomers are not photoinitiator monomers. In some embodiments, the first acrylic copolymer is also substantially free of photoinitiator monomers.

The low molecular weight acrylic copolymer component (that is, the second acrylic copolymer) may be formed using conventional polymerization techniques as discussed above with regard to the high molecular weight acrylic copolymer component (or first acrylic copolymer). In addition to monomer(s) C and monomer(s) D, a polymerization initiator and/or chain transfer agent may be present during the polymerization reaction.

In some embodiments, the second acrylic copolymer has a number average molecular weight, $M_n$, of less than about 70,000. In some embodiments, the second acrylic copolymer has weight average molecular weight, $M_w$, of less than about 100,000. In some embodiments, the second acrylic copolymer has a number average molecular weight, $M_n$, ranging from about 10,000 to about 70,000 (and/or a $M_w$ of from about 14,000 to about 100,000). In some embodiments, the second acrylic copolymer has a number average molecular weight, $M_n$, ranging from about 15,000 to about 60,000 and/(or a $M_w$ of from about 20,000 to about 84,000), and, in some embodiments, a $M_n$ of from about 20,000 to about 55,000 (and/or a $M_w$ of from about 28,000 to about 77,000).

The second acrylic copolymer may be present in an amount that varies depending on the desired properties of the resulting adhesive composition. Typically, the second acrylic copolymer is present in an amount less than about 50 pbw based on a total weight of the adhesive composition. In some embodiments, the second acrylic copolymer is present in an about less than about 40 pbw, or less than about 35 pbw, or even less than about 30 pbw. In some embodiments, the second acrylic copolymer is present in an amount ranging from about 25 to about 2 pbw, based on a total weight of the adhesive composition.

In some embodiments, various additives or other ingredients may be added to the adhesive composition to impart or modify particular characteristics of the ultimate adhesive composition. The additives may be present in any amount as long as the amount does not adversely interfere with the desired properties of the adhesive composition. In some embodiments, the adhesive composition comprises one or more additives in an amount of up to about 50 weight percent, based on the total weight of the adhesive composition. Exemplary additives include, but are not limited to, tackifiers, plasticizers, fillers, antioxidants, pigments, diffusing materials, fibers, filaments, silicas, treated silicas, carbon black, dyes, expandable polymeric microspheres, non-expandable polymeric or glass microspheres, chain transfer agents, chemical blowing agents, reinforcing agents, calcium carbonate, toughening agents, fire retardants, acrylate-insoluble polymers, finely ground polymeric particles such as polyester, nylon, or polypropylene, stabilizers, and combinations thereof.

In one exemplary embodiment, the adhesive composition comprises a foam having voids throughout at least a portion of the adhesive composition. Voids may be formed by incorporating a variety of additives into the adhesive core layer prior to or during formation of the adhesive core layer. For example, expandable polymeric microspheres, hollow polymeric or glass microspheres, foaming agents, or any combination thereof may be incorporated into the adhesive core layer in order to form voids throughout at least a portion of the adhesive core layer. Suitable void-forming materials include, but are not limited to, void-forming materials disclosed in U.S. Pat. No. 6,103,152. In some embodiments, expandable polymeric microspheres, such as those disclosed in U.S. Pat. No. 6,103,152, are incorporated into the adhesive composition in an amount ranging from about 1 pbw to about 15 pbw, and, in some embodiments, from about 2 pbw to about 6 pbw, based on a total weight of the adhesive composition.

In some embodiments, the adhesive composition may be an outermost layer of the adhesive article. In some embodiments, the adhesive composition may be sandwiched between two or more similar or dissimilar substrates.

In some embodiments, the adhesive articles of the present disclosure comprise one or more layers with at least one layer, for example, a core layer, being formed from an adhesive composition comprising a crosslinkable or crosslinked mixture of high and low molecular weight acrylic copolymers. As shown in FIG. 1, exemplary adhesive article 40 comprises adhesive core layer 41 having first major surface 42 and second major surface 44. In some embodiments, adhesive article 40 includes at least one of first additional layer 43 on first major surface 42, and second additional layer 45 on second major surface 44. Exemplary adhesive article 40 further comprises first outer major surface 46 on first additional layer 43 and second outer major surface 48 on second additional layer 45.

Generally, the adhesive core layer comprises an intimate mixture (or blend) of the above-described first and second acrylic copolymers. In some embodiments, the first and second acrylic copolymers are mixed with one another so as to result in a desired degree of hydrogen bonding between the first and second acrylic copolymers. In some embodiments, the first and second acrylic copolymers are mixed so as to result in a degree of hydrogen bonding that provides an adhesive core having a desired amount of stress relaxation, while maintaining desired performance during high temperature shear.

In some embodiments, the first and second acrylic copolymers are substantially miscible with one another so that the resulting mixture comprises a single phase or domain. In other embodiments, the first and second acrylic copolymers, when mixed, form two separate phases or domains intimately blended with one another. In either case, the resulting mixture provides a degree of hydrogen bonding between the first and second acrylic copolymers.

In one exemplary embodiment in which the first and second acrylic copolymers are extruded with one another, the polymers may be immiscible with one another so that small domains of each polymer are present in the extrudable mixture. By minimizing the time between mixing and extruding or by using in-line static mixing, extrusion of the adhesive mixture can occur before any substantial amount of phase separation takes place. By cooling the extrudate in a relatively rapid manner, the first and second acrylic copolymers remain in an intimate mixture, which can then be subsequently crosslinked as described below.

Figure 7:
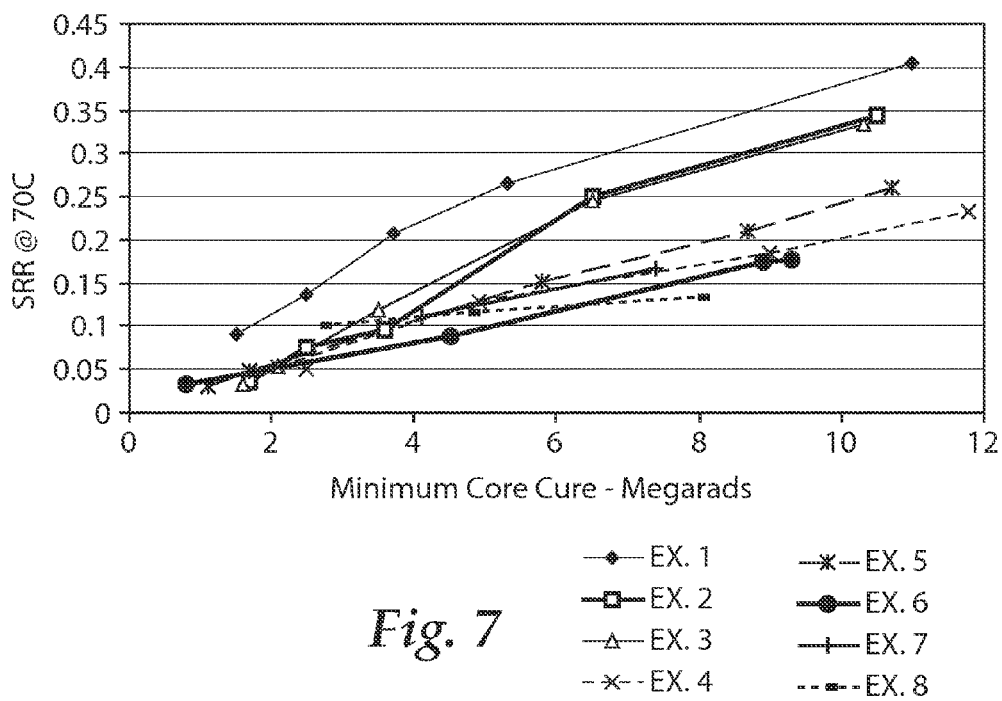
FIG. 7 provides an exemplary graph showing Stress Relaxation at 70° C. versus Minimum Calculated Core Cure for sample tapes of Examples 1-8.

In some embodiments, the adhesive composition possesses a stress relaxation ratio (G(300)/G(0.1)) value (that is, "SRR value") of less than about 0.3, and in some embodiments, from about 0.1 to about 0.3, as measured by the "Stress Relaxation Test" conducted at 70° C. (as described below in the "Test Methods" section). The SSR value of a given adhesive composition provides an indication of the ability of the adhesive to (i) deform under continuous load and (ii) resist deformation as the adhesive extends under the continuous load. FIG. 7 provides an exemplary graph showing the change in SRR values of various polymer compositions as the amount of exposure to electron beam radiation increases. The controlled amount of exposure to electron beam radiation is measured as a minimum calculated core cure ("MCCC") amount as described in the "Test Methods" section below.

The calculated cure is dependent on the specific equipment used to deliver the electron beam, and those skilled in the art can define a dose calibration model for the equipment used. For example, in the present disclosure, the radiation processing is performed on an Energy Sciences, Inc. (Wilmington, Mass.), Model CB-300 electron beam generating apparatus equipped with a 76.2 micrometer (µm) (0.003 inch) thick, 30.48 millimeter (mm) (12 inch) wide polyester terephthalate support film running through an inert chamber as described below.

In one exemplary embodiment, adhesive compositions may have a SSR value of less than about 0.35, and in some embodiments, from about 0.1 to about 0.3, after exposure to electron beam radiation. In a further exemplary embodiment, the adhesive composition has a SSR value of less than about 0.28, for example, from about 0.12 to about 0.25, or even from about 0.15 to about 0.23, after exposure to electron beam radiation.

As discussed above, in some embodiments, the adhesive composition comprises a foam core layer. Solid adhesive core layers (that is, non-foam layers) typically have a layer density ranging from about 0.92 g/cc to about 1.2 g/cc, while adhesive foam core layers, themselves, typically have a layer density ranging from about 0.3 g/cc to about 0.7 g/cc. Typically, articles resulting from the combination of one or more skin layers with the adhesive core layers have an overall density ranging from about 0.4 grams per cubic centimeter (g/cc) to about 0.8 g/cc.

In some embodiments, the adhesive composition exhibits resistance to a static shear load, which is measured by a hanging shear test (described in the "Test Methods" section below). Hanging shear measures the ability of a defined area of a pressure sensitive adhesive (PSA) adhesive bonded between two rigid surfaces to hold a fixed weight hanging from one edge of one of the surfaces without substantially sliding apart (falling off). It is usually measured in minutes of hang time with a given area, (typically about either 323 sq mm or 635 sq mm) and a given load (typically 500 g/323 sq mm or 1000 g/625 sq mm at 70° C. or 2 kg/625 sq mm. at room temperature).

In some embodiments, the adhesive composition of the present disclosure remain intact after 5,000 minutes, and, in some embodiments, after 10,000 minutes with a 500 gram weight hanging from one panel both at 70° C. and at room temperature. The 70° C. temperature objective is typically more difficult to meet.

In addition to the adhesive core layer described above, in some embodiments, the present disclosure provides adhesive articles that may include one or more additional layers on either side of the adhesive core layer. The one or more additional layers may each independently be temporarily or permanently attached to an outer surface of the adhesive core layer. Suitable additional layers are described below.

Referring to exemplary adhesive article 40 shown in FIG. 1, first additional layer 43 and/or second additional layer 45 could be adhesive layers. The one or more additional adhesive layers may be any suitable adhesive known in the art, including, for example, an adhesive that is activatable by pressure, heat or a combination thereof. Suitable adhesives include, but are not limited to, adhesive compositions comprising (meth)acrylate copolymers, rubber/resins, epoxies, urethanes or combinations thereof. Each additional adhesive layer may be applied to an outer surface of the adhesive core layer by any known method including, for example, by solution, water-based or hot-melt coating methods, including hot melt co-extrusion methods where one or more layers are formed simultaneously with the above-described adhesive core layer. Each additional adhesive layer may include hot melt coated formulations, transfer-coated formulations, solvent-coated formulations, and latex-coated formulations, as well as, laminating, thermally-activated, and water-activated adhesives and bonding agents. In some embodiments, at least one of the additional adhesive layers, when present, comprises a pressure sensitive adhesive (PSA), a heat-activatable adhesive layer (for example, a hot melt adhesive layer), or a combination thereof.

Examples of suitable pressure sensitive adhesives include, but are not limited to, PSAs based on general compositions of poly(meth)acrylate; polyvinyl ether; diene rubber such as natural rubber, polyisoprene, and polybutadiene; polyisobutylene; polychloroprene; butyl rubber; butadiene-acrylonitrile polymer; thermoplastic elastomer; block copolymers such as styrene-isoprene and styrene-isoprene-styrene (SIS) block copolymers, ethylene-propylene-diene polymers, and styrene-butadiene polymers; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures or blends (continuous or discontinuous phases) of the above.

Examples of suitable heat-activatable adhesives include, but are not limited to, heat-activatable adhesives based on general compositions of polyolefins, copolymers containing olefin monomers, etc.

As discussed with regard to the adhesive core layer above, each additional adhesive layer adhesive composition may contain additives.

In some embodiments, the adhesive article comprises an adhesive core layer in combination with at least one additional adhesive layer, wherein the at least one additional adhesive layer is present on a major surface of the adhesive core layer in the form of a PSA layer. In a further exemplary embodiment, the adhesive article comprises an adhesive core layer in combination with PSA layers on both major surfaces of the adhesive core layer. In either of these embodiments, the PSA may comprise a PSA containing a styrene-isoprene asymmetric star block copolymer such as disclosed in U.S. Pat. No. 5,393,787 issued to Nestegard et al., U.S. Pat. No. 6,503,621 issued to Ma et al., or U.S. Pat. No. 6,630,531, issued to Khandpur et al., all of which are assigned to 3M Innovative Properties Company (St. Paul, Minn.), the subject matter of which is hereby incorporated herein in its entirety.

In addition to the adhesive core layer and any optional additional adhesive layers described above, the adhesive articles may include one or more release liners to protect an outer surface of an adhesive core layer or any additional adhesive layer of the adhesive article.

Figure 2:
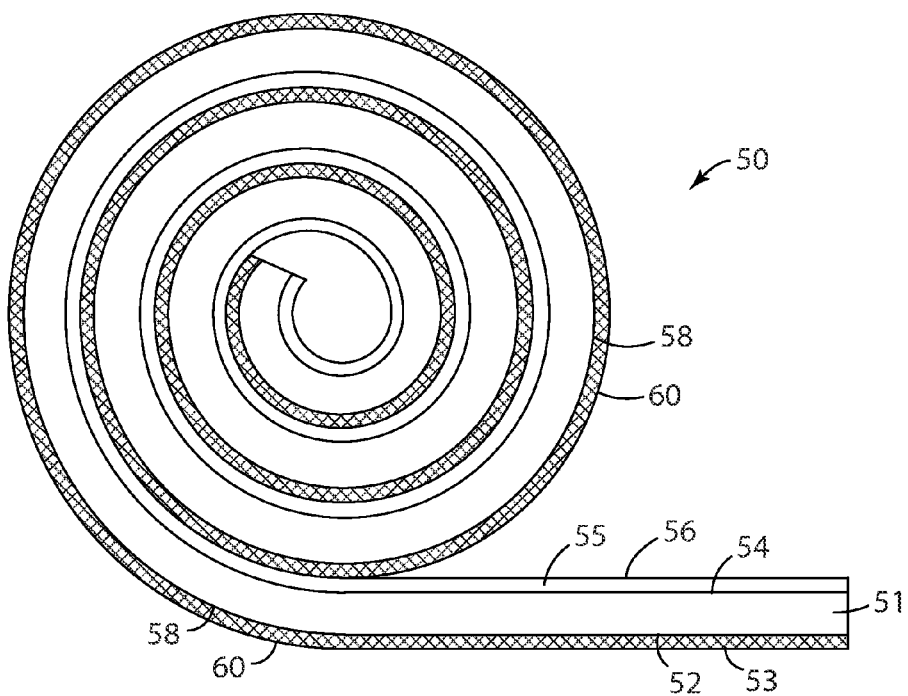
FIG. 2 is a cross-sectional view of an exemplary tape according to some embodiments of the present disclosure in roll form comprising an exemplary adhesive article having a removable release liner on an outer surface thereon.

As shown in FIG. 2, exemplary adhesive article 50 comprises adhesive core layer 51 having first major surface 52 and second major surface 54, release liner 53 on first major surface 52, and an additional layer 55 on second major surface 54. Exemplary adhesive article 50 further comprises first outer major surface 56 on additional layer 55, and release liner inner surface 58 and release liner outer surface 60 on release liner 53.

Release liners are well-known in the art, and any known release liner may be used. Typically, the release liner comprises a film or paper substrate coated with a release material. Commercially available release liners include, but are not limited to, silicone coated papers, and silicone coated films, such as polyester films. Examples of suitable release liners include, but are not limited to, release liners sold under the trade designation AKROSIL™ available from Akrosil Europe (Huerlen, Netherlands) and International Paper (Menasha, Wis.); and release liners available from Daubert Coated Products, Inc. (Dixon, Ill.). In some embodiments, the release liner comprises AKROSIL™ Paper Liner ZG-3223 (Akrosil Europe, Huerlen, Netherlands) or AKROSIL™ Paper Liner SBL 60 SC SILOX F1U/F4B (International Paper, Menasha, Wis.).

In one exemplary embodiment, the above-described adhesive article comprises a release liner as disclosed in U.S. Pat. Nos. 6,835,422; 6,805,933; 6,780,484; or 6,204,350 assigned to 3M Innovative Properties Company.

Referring again to FIG. 2, it should be noted that release liner 53 may provide release properties along release liner inner surface 58, release liner outer surface 60, or both. For example, if additional layer 55 is an additional adhesive layer, such as a PSA, release liner outer surface 60 of release liner 53 will desirably have release properties. If first outer major surface 56 on additional layer 55 does not have any degree of adhesive tackiness, release liner outer surface 60 of release liner 53 does not need release properties.

In a further embodiment, additional layer 55 on second major surface 54 of adhesive core layer 51 also comprises a release liner such that release liner 53 and additional layer 55 protect protection to first major surface 52 and second major surface 54 of adhesive core layer 51.

In some embodiments, adhesive articles of the present disclosure may also include one or more additional layers that may provide additional temporary or permanent properties to the adhesive articles. Suitable additional layers may be positioned on one or both sides of the adhesive core layer. In some embodiments, the one or more additional layers are flexible such that the resulting adhesive article may be rolled into a roll. The one or more additional layers may function as, for example, tie layers, primer layers, or barrier layers. Suitable additional layers include, but are not limited to, polymer films, metal foils, papers, foam sheets, and fabrics. The one or more additional layers may be attached to the adhesive core layer by a pressure-sensitive adhesive as described above or by the adhesive core layer composition itself.

Examples of suitable substrates include, but are not limited to, glass, metal, plastic, wood, and ceramic substrates, painted surfaces of these substrates, and the like. Representative plastic substrates include polyester, polyvinyl chloride, ethylene-propylene-diene monomer rubber, polyurethanes, polymethyl methacrylate, engineering thermoplastics (for example, polyphenylene oxide, polyetheretherketone, polycarbonate), and thermoplastic elastomers. The substrate may also be a woven or knitted fabric formed from threads of synthetic or natural materials such as, for example, cotton, nylon, polyamide, rayon, glass, carbon or ceramic material. The substrate may also be made of a nonwoven fabric such as air-laid webs of natural or synthetic fibers or blends thereof.

The present disclosure also provides methods of making adhesive compositions and articles. In one exemplary embodiment, the method of making an adhesive composition comprises mixing the above-described adhesive composition components. Desirably, the components are mixed to form a substantially homogeneous adhesive composition mixture. The method may further comprise a number of optional steps depending on the ultimate use of the adhesive composition. For example, the method may comprise a method of forming an adhesive article, wherein the method comprises shaping the adhesive composition into an adhesive article (for example, a coating step or an extrusion step). In addition, post-shaping steps may be used to impart desired physical properties to the shaped adhesive article. For example, the method of forming an adhesive article may further comprise exposing a portion of the shaped adhesive article to radiation in order to crosslink one or more components within the shaped adhesive article.

Exemplary methods of making adhesive compositions and adhesive articles are described below.

Adhesive core layers may be prepared using conventional method steps such as those disclosed in U.S. Pat. No. 6,103,152 issued to Gehlsen. Typically, the method of making an adhesive article comprising at least one adhesive core layer comprises melt-mixing the above-described adhesive components to form a substantially homogeneous mixture, shaping the substantially homogeneous mixture to form a shaped adhesive article, and allowing the shaped adhesive article to cool. In some embodiments, the shaping step may comprise providing the adhesive composition mixture onto a temporary substrate (for example, a release liner) or permanent substrate (for example, a backing layer or other adhesive layer), for example, by a coating step. In other embodiments, the shaping step may comprise providing the adhesive composition mixture onto a temporary substrate (for example, a release liner) or permanent substrate (for example, a backing layer or other adhesive layer) via an extrusion step.

Figure 3:
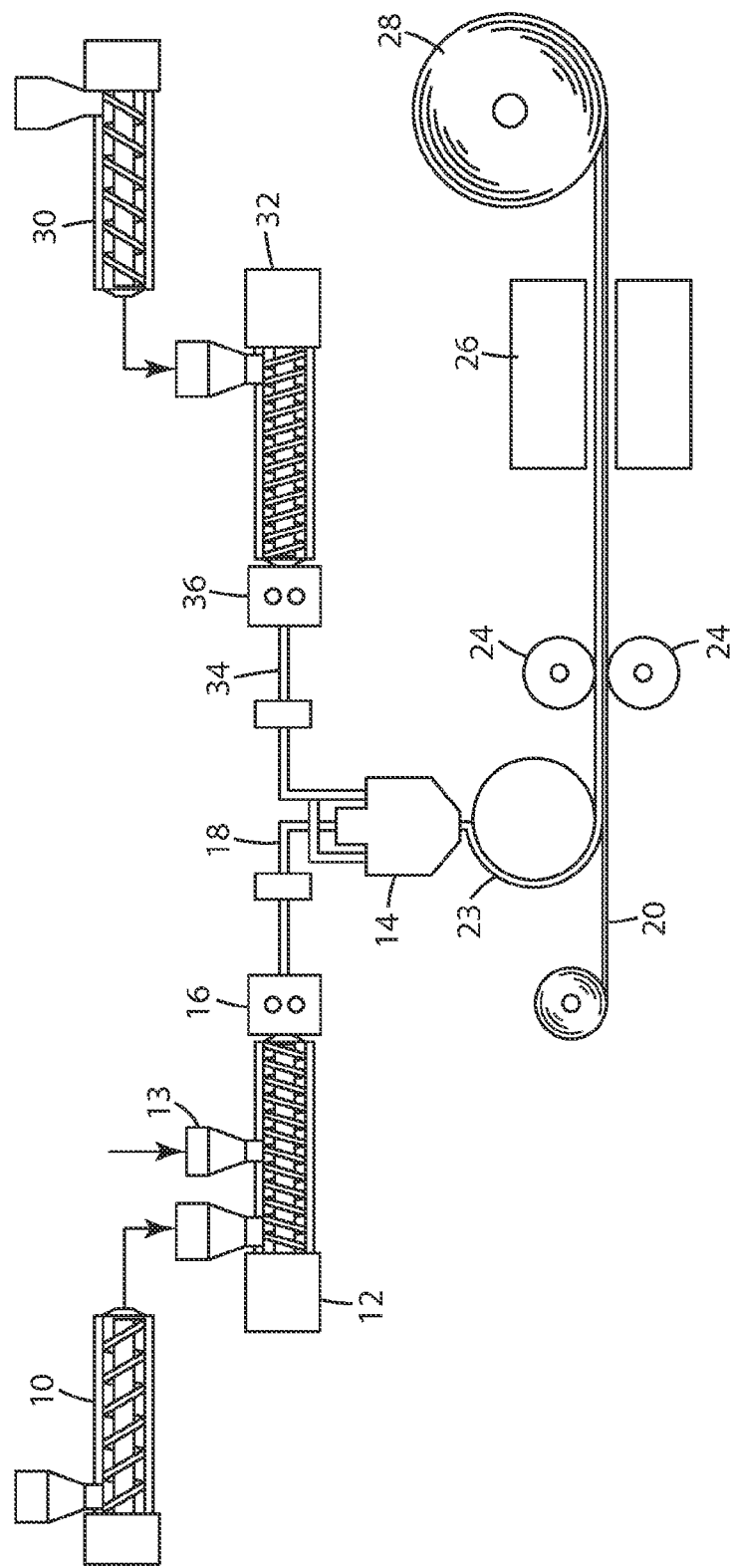
FIG. 3 is a schematic drawing of an exemplary extrusion process for preparing adhesive articles according to some embodiments of the present disclosure.

In one embodiment, the method of forming an adhesive article comprises an extrusion step. FIG. 3 depicts an extrusion apparatus suitable for use in some methods of the present disclosure. In this exemplary embodiment, each of the above-described copolymers (for example, first and second acrylic copolymers) may be initially fed into a first heating and conveying device 10 such as a roll feeder, single screw extruder (as shown), grid melter, or bonnot, where input materials, such as each of the copolymers are melted. The copolymers may be added to heating and conveying device 10 in any convenient form, including pellets, billets, packages, strands, and ropes. At the end the heating and conveying device, is typically, a metering device (not shown), such as a gear melt pump, where the output rate of the melted polymer can be controlled. At the end of the metering pump, a heated hose (not shown) may be used to convey the metered output to, for example, a twin screw extruder 12. Twin screw extruder 12 is typically fitted with ports (not shown) along its length, for inputting metered liquids, such as melted copolymers, tackifiers, stabilizers, and the like, usually under pressure. Twin screw extruder 12 also has open ports 13 that are not under pressure, where dry solids, such as stabilizers, pigments, rubbers and/or plastic pellets, expandable microspheres, and the like can be supplied. The dry solid materials are typically conveyed to open port 13 via a weight loss feeder (not shown) to control the feed rate. Along the length of the twin screw extruder 12 are mixing kneaders and/or conveying sections, which allow control of the degree of mixing of the separately fed materials. Various sections of the twin screw extruder 12 can be heated or cooled to control the temperature of the mixing and conveying process, as well as the twin screw turning rate.

Desirably, mixing is carried out at a temperature insufficient to cause substantial microsphere expansion within the twin screw extruder 12 for embodiments in which expandable microspheres are present during mixing. For example, mixing temperatures may be from about 100° C. to about 125° C. In other embodiments, it is also possible to use temperatures in excess of a microsphere expansion temperature (for example, mixing temperatures may be from about 125° C. to about 160° C.) either because the pressures of the extruder/mixing/conveying process prevent substantial expansion until the mixture reaches the coating head or because the temperature can be reduced prior to adding the microspheres. In actual practice, some of the expandable microspheres can be broken during mixing, and such conditions may be optimized to minimize breakage. Specific temperatures, pressures, shear rates, and mixing times are selected based upon the particular composition being processed.

At the end of the extruder is, typically, a gear melt pump 16, which provides an output stream free of pressure surges. The metered output is typically fed via a heated pipe or hose 18 to a coating head, such as a die 14 (for example, a contact or drop die). Optionally, an in-line mixing device (not shown), such as a static mixer, may be used to optimize the mixture and temperature homogeneity, especially if the heated pipe or hose 18 is long. The temperature and pressure within die 14 is desirably controlled to cause expansion of expandable microspheres (when present) within the die lips, as the composition exits the coating head 14 and experiences the pressure drop to normal atmospheric conditions.

The shape of the adhesive core layer is dictated by the shape of die 14. Although a variety of shapes may be produced, the adhesive core layer is typically produced in the form of a continuous or discontinuous sheet having outer major surfaces separated from one another by a peripheral edge.

As shown in FIG. 3, the adhesive core layer 23 may optionally be combined with a temporary or permanent layer 20 (for example, a release liner) dispensed from a feed roll 22. Suitable temporary layers for layer 20 include, but are not limited to, silicone release liners, polyester films (for example, polyethylene terephthalate films), and polyolefin films (for example, polyethylene films), as well as other release layers described above. Layer 20 and the adhesive core layer are then laminated together between a pair of nip rollers 24. Following lamination, the adhesive core layer is optionally exposed to radiation from an electron beam source 26 to crosslink the adhesive core layer. The electron beam can be provided from one or both sides of the core layer either through a temporary or permanent layer, or directly onto an exposed surface of the core layer. Other sources of radiation (for example, ion beam, gamma radiation, and ultraviolet radiation) may be used as well. Crosslinking improves the cohesive strength of the adhesive core layer. Following exposure, the laminate is rolled up to form a take-up roll 28.

In some embodiments, the method of forming an adhesive article comprises exposing the adhesive core layer to electron beam radiation so as to provide a controlled amount of crosslinking between the first and second acrylic copolymers of the adhesive core layer. Depending on the thickness and density of the adhesive composition, a particular accelerating voltage and dose of the electron beam is directed at the adhesive mass from one or both sides of the sheet so that the resulting adhesive core layer has a desired balance of properties, for example, shear strength, stress relaxation, and the like.

In some embodiments, the method of forming an adhesive article comprises extruding a blend of the first acrylic copolymer and the second acrylic copolymer; and exposing the extrudate to an amount of irradiation so as to obtain a controlled degree of crosslinking between the first acrylic copolymer and the second acrylic copolymer. In some embodiments, the resulting adhesive article has a stress ratio G(300)/G(0.1) as measured by a Stress Relaxation Test at 70° C. of less than about 0.30, and, in some embodiments, from about 0.10 to about 0.30 as discussed above.

Further, as discussed above, the relative amounts (that is, pbw) of monomer(s) B and D in the first and second acrylic copolymers, respectively, may be varied so as to provide a desired degree of hydrogen bonding between the first and second acrylic copolymers. As discussed above, in some embodiments, the pbw of monomer(s) D in the second acrylic copolymer is greater than the pbw of monomer(s) B in the first acrylic copolymer, and, in some embodiments, at least about 3 pbw greater than the pbw of monomer B in the first acrylic copolymer.

In some embodiments, the method of making an adhesive article comprises providing an electron beam generating apparatus having a first control for an accelerating voltage and a second control for a dose; providing a material to be cured having a composition, a thickness, and a density; determining one or more desired properties capable of resulting from a controlled amount of crosslinking using the electron beam generating apparatus; and using a Minimum Calculated Core Cure value of the material based on dose-depth profile calibration curves for the electron beam generating apparatus and for the material to be cured, crosslinking the material at a voltage and dose that results in the one or more desired properties. For example, the one or more desired properties may comprise stress relaxation, shear strength, or a combination thereof. This exemplary method may further comprise preparing the dose-depth profile calibration curves for the electron beam generating apparatus and for the material to be cured based on the composition, thickness, and density of the material; and determining the Minimum Calculated Core Cure value based on the dose-depth profile calibration curves. As described in the Examples below, a Monte Carlo code can be used to assist in the determination of the Minimum Calculate Core Cure value.

The exemplary method of making an adhesive article using a Minimum Calculated Core Cure value of the material based on dose-depth profile calibration curves for the electron beam generating apparatus and for the material to be cured desirably utilizes a cure procedure that results in a cure gradient through a cross section of the thickness of the material being cured. Typically, the material to be cured is in the form of a sheet having a given sheet thickness. Desirably, at least one of the dose-depth profile calibration curves for the cured material exhibits a minimum within a middle 80% of the thickness of the material, more desirably, within a middle 50% of the thickness of the material. Further, at least one of the dose-depth profile calibration curves for the cured material exhibits a concave downward profile.

The exemplary method of making an adhesive article using a Minimum Calculated Core Cure value of the material based on dose-depth profile calibration curves for the electron beam generating apparatus and for the material to be cured can be used to make an adhesive article, such as the above-described adhesive article comprising a blend of high and low molecular weight acrylic copolymers. In one exemplary method, the material to be cured comprises a blend of (1) the first acrylic copolymer and (2) the second acrylic copolymer; wherein the pbw of monomer(s) D in the second acrylic copolymer is greater than the pbw of monomer(s) B in the first acrylic copolymer.

The present disclosure is also directed to methods of making multi-layered articles comprising at least one adhesive core layer. The adhesive core layer may be combined with one or more additional layers using conventional techniques including, but not limited to, lamination, coating, coextrusion, etc. Suitable additional layers include layers described above.

In some embodiments, multi-layered adhesive articles are desirably formed by co-extruding the above-described extrudable adhesive composition containing first and second acrylic copolymers with one or more extrudable polymer compositions. The number and type of polymer compositions are selected based upon the desired properties of the final adhesive article. For example, in the case of adhesive core layers having relatively low tack at room temperature (for example, the adhesive core layer is not a PSA), it may be desirable to combine the adhesive core layer with one or more PSA compositions to form an adhesive article having outer surface tack at room temperature. Other examples of polymer compositions that may be prepared by co-extrusion include, but are not limited to, relatively high modulus polymer compositions for stiffening the article (semi-crystalline polymers such as polyamides and polyesters), relatively low modulus polymer compositions for increasing the flexibility of the article (for example, plasticized polyvinyl chloride), and additional foam compositions.

In one embodiment, the method of making multi-layered articles comprises a coextrusion step wherein additional extrudable polymer compositions are coextruded with the above-described extrudable adhesive compositions. FIG. 3 illustrates one coextrusion process for producing a multi-layered article comprising an adhesive core layer sandwiched between a pair of additional layers. As shown in FIG. 3, polymer resin is optionally added to a first extruder 30 (for example, a single screw extruder) where it is softened and ground into particles. The resin particles are then fed to a second extruder 32 (for example, a single or twin screw extruder) where they are mixed with any desired additives. The resulting extrudable composition is then metered to the appropriate chambers of die 14 through transfer tubing 34 using a gear pump 36. The resulting article is a three-layer article featuring an adhesive core layer having a polymer layer on each of its major surfaces (see, for example, such a three-layer article in FIG. 1, namely exemplary adhesive article 40).

It is also possible to conduct the co-extrusion process such that a two-layer adhesive article is produced, or such that adhesive articles having more than three layers (for example, 10-100 layers or more) are produced by equipping die 14 with an appropriate feed block, or by using a multi-vaned or multi-manifold die. Multilayer adhesive articles can also be prepared by laminating additional layers to the adhesive core layer, or to any of the co-extruded polymer layers after the adhesive article exits die 14. Other techniques which can be used include stripe coating.

Various adhesive articles of the present disclosure may be used in a number of applications. As described above, the adhesive articles may comprise a single adhesive core layer or may comprise one or more layers in addition to an adhesive core layer. The adhesive articles may be present in the form of a strip, tape, roll of tape, or any other construction known in the art. The adhesive articles may be bonded to one or more substrates to provide a multi-layered article having a desired degree of contact between the adhesive article and one or more substrates bonded thereto.

In some embodiments, the adhesive articles may be particularly useful in a variety of applications, including aerospace, automotive, and medical applications. The properties of the adhesive articles may be tailored to meet the demands of the desired applications. Specific examples of applications include, but are not limited to, vibration damping articles, medical dressings, tape backings, retroreflective sheet backings, anti-fatigue mats, abrasive article backings, gaskets, and sealants.

Various exemplary embodiments of the present disclosure are described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

These examples are merely for illustrative purposes only and are not meant to be limiting on the scope of the appended claims. All parts, percentages, ratios, etc. in the examples and the rest of the specification are by weight unless indicated otherwise.

As used herein, a sheet generally refers to a sheet of material(s), such as a foam sheet, that typically has a thickness of at least about 5 mils. A film generally refers to a thinner sheet typically having a thickness of about 5 mils or less. A tape generally refers to a sheet that has been cut into a narrower width. In the examples, the terms sheet, film and tape may be used interchangeably.

Test Methods:
Gel Permation Chromatography (GPC)

Gel Permation Chromatography was used to determine the molecular weights of the polymers. A sample of the resulting polymer was removed from the package and Gel Permeation Chromotography was performed on the sample according to the manufacturer's general instructions and the following procedure to determine the molecular weight. Three samples weighing approximately 25 milligrams (mg) were tested for each of the polymers. Each sample was dissolved in 10.00 ml of tetrahydrofuran over a three day period, and then filtered using a 0.25 micron Gelman PTFE syringe filter. A WATERS Alliance 2695 Separations Module (available from Waters, Inc. (Milford, Mass.)) was used to inject 100 microliters of each sample solution into a two column set (available from Jordi Associates Inc. (Bellingham, Mass.)). One column was equipped with a mixed bed and the other with a 500 A column, both 25 cm). The WATERS 2695 chromatograph was operated at room temperature, using tetrahydrofuran as the eluent, flowing at a rate of 1.0 ml/min. A Shimadzu Scientific Inc. (Columbia, Md.) RID-10A refractive index detector was used to detect changes in the concentration. The molecular weight calculations were based on calibrations made of narrow polystyrenes ranging in molecular weight from $7.50 \times 10^6$ to 580.

Minimum Calculated Core Cure (MCCC)

The Minimum Calculated Core Cure (MCCC) was used as a measure of the controlled amount of electron beam radiation delivered at various depths through a thickness cross section of a specific material, for example, a sheet or tape, having a specific composition, thickness, and density. The electron beam dose at a given accelerating voltage was plotted against thickness to obtain a dose-depth profile having a minimum in approximately the center portion of the cross section of the tape. Separate samples of each tape construction were treated to a different dose and accelerating voltage. The minimum cure in approximately the center of the core, that is, the dose delivered to that part of the core, was calculated for each tape and process conditions. The average cure throughout the thickness of the tape was also calculated for an Average Calculated Core Cure (ACCC). The samples were tested for one or more desired end properties, for example, stress relaxation and hanging shear strength in this case. Stress relaxation expressed as the Stress Relaxation Ratio (SRR) was then plotted as a function of the Minimum Calculated Core Cure. The SRR was also plotted as a function of the product (Prod) of the ACCC and the MCCC. The product provides somewhat more delineation of the values in the plots and is consistent with the plot of just MCCC. Monte Carlo code was used to help predict the depth and dose values based on the apparatus and the tape construction, that is, the composition, thickness, and density, to facilitate adjustment of the electron beam dose at various depths to allow delivery of the optimal dose to obtain the desired end product. This methodology is described in U.S. Pat. No. 6,749,903, the subject matter of which is hereby incorporated herein in its entirety.

The calculated cure depends on the specific equipment used to deliver the electron beam, and those skilled in the art can define a dose calibration model for the equipment used. For the examples described herein, the radiation processing was performed on a Model CB-300 electron beam generating apparatus (available from Energy Sciences, Inc. (Wilmington, Mass.) equipped with a 0.076 mm (0.003 inch) thick, 30.48 cm (12 inch) wide polyester terephthalate support film running through an inert chamber. A sample of a tape with a liner on both sides was taped onto the support film and conveyed at a speed of about 6.1 meters/min (20 feet/min) such that the tape was treated from one side through the polyethylene release liner. A thicker sample, such as a foam tape, may exhibit a cure gradient through the cross section of the tape so that it is desirable to expose the tape to electron beam radiation from both sides. For the examples, the tape was treated from both sides by turning the sample over after one pass through the machine and conveying it through the machine again. This provided a controlled dose to the central portion of the adhesive tape to effect crosslinking and hence, temperature resistance. The oxygen level within the chamber of the CB-300 was restricted to a range of 50 to 100 ppm. The standard nitrogen gap between the window and the web path was 47 mm and the same machine settings were used on each pass through the machine.

Prior to treating samples, the electron beam apparatus was calibrated according to ASTM E 1818 with dosimetry using 10 micron and 45 micron dosimeters, which are polymeric films containing radiochromic dye, commercially available from Far West Technologies, Inc. (Goleta, Calif.). The calibration provided a measure of surface dose and a dose/depth profile as a function of accelerating voltage and beam current. The actual sample dose is the energy deposited into a square centimeter of substrate divided by the density of the sample, so the dose-depth profile for substrates having different densities than the dosimeters were normalized. A dose-depth profile was calculated for each tape construction (which typically has a liner, a foam core of a specific composition, and optional skin layers of specific compositions on the foam core) to account for the differences in densities of the different layers that the electron beam must penetrate to reach the center of the tape. Samples tested for Stress Relaxation Ratio (SRR) were representative of the thickness and density of the samples that received a specified dose at a specified accelerating voltage. The thickness and density measurements were typically made immediately adjacent to the area from which the SRR measurements were made.

Stress Relaxation Ratio—G(300)/G(0.1)—(SRR)

The Stress Relaxation Ratio (G(300)/G(0.1) test was used to characterize the time dependent behavior of an adhesive article, for example, a tape sample, when a constant level of shear strain is applied to a sample. The shear modulus of a sample was measured at specific time intervals during the test. When the test was completed, a ratio was calculated using the modulus at 300 seconds divided by the modulus at 0.1 seconds (G(300)/G(0.1)). This "stress ratio" provides an indication of a material's "firmness" (for example, the material's response under load).

The Stress Relaxation Ratio (G(300)/G(0.1) test was performed using an Advanced Rheometric Expansion System (ARES) (available from TA Instruments (New Castle, Del.)) with a 25 mm Parallel Plate Test Fixture. The rheometer was equipped with RSA Orchestrator software. The tape sample was a circular disc having a diameter of 24.5 mm (1 inch) and a thickness of approximately 0.51 mm (20 mil). For samples thinner than 0.51 mm, several layers may be laminated together to provide the requisite thickness. The test was run at 70° C. (+/−1° C.) with a 1 mm gap and 25% strain. The data was recorded on a chart of the modulus (G) over time (seconds). The Stress Relaxation Ratio was calculated by dividing the modulus (G) at 300 seconds by the modulus at 0.1 second.

Hanging Shear

The Hanging Shear test was used as an indication of a tape's internal cohesive strength at elevated temperature. A sample of tape measuring 2.54 cm by 1.27 cm was laminated to an etched aluminum panel measuring 2.54 cm by 5.08 cm such that the tape edges were coextensive with edges of the panels. The panel overlapped 1.27 cm to cover the tape and the free ends of the panels extended in opposite directions. One end of a panel was hung on a rack in an oven set at 70° C. with a 500 gram weight hanging from the bottom of the end of the other panel so that the tape sample was under shear stress. The time for the bottom panel to release from the hanging panel was measured up to 10,000 minutes. Test results are reported as Pass, that is, the panels were still adhered together after 10,000 minutes in the oven, or Fail, that is, the bottom panel had pulled away from the top panel in less than 10,000 minutes.

Pressure-Sensitive Adhesive Compositions

Packaged pressure-sensitive adhesive compositions were prepared according to the method described in U.S. Pat. No. 5,804,610, the subject matter of which is hereby incorporated herein in its entirety, using the compositions and materials as listed below.

PSA-1—A pressure-sensitive adhesive (PSA) composition was prepared by mixing 45 parts of IOA (isooctyl acrylate), 45 parts of BA (butyl acrylate), 10 parts of AA (acrylic acid), 0.15 part 2,2 dimethoxy-2-phenylacetophenone (IRGACURE™ 651 available from Ciba Specialty Chemicals Corp. (Tarrytown, N.Y.)), and 0.06 part of IOTG (isooctyl thioglycolate). The composition was placed into packages measuring approximately 10 cm by 5 cm by 0.5 cm thick as described in U.S. Pat. No. 5,804,610, the subject matter of which is hereby incorporated herein in its entirety. The packaging film was a 0.0635 mm thick ethylene vinyl acetate copolymer film (VA-24 Film available from CT film (Dallas, Tex.)). The packages were immersed in a water bath and simultaneously exposed to ultraviolet radiation at an intensity of about 3.5 milliWatts per square centimeter, and a total energy of about 1680 milliJoules per square centimeter as measured in NIST units. The PSA included both the polymer and the packaging film. The resulting polymer, that is, without the packaging film, had a $M_w$ of about $5.75 \times 10^5$ and a $M_n$ of about $1.98 \times 10^5$ as measured by the Gel Permeation Chromatography procedure described above.

PSA-2—A PSA composition was prepared according to the procedure above for PSA-1 except that the composition was 95 parts of 2-EHA (2-ethylhexyl acrylate), 5 parts of AA, 0.15 part IRGACURE™ 651 photoinitiator, and 0.02 part of IOTG. The resulting polymer had in a $M_W$ of about $5.54 \times 10^5$ and a $M_n$ of about $1.48 \times 10^5$ when measured according to the previously described GPC procedure.

PSA-3—A PSA composition was prepared according to the procedure for PSA-2 except for the following changes in the composition: 0.2 parts of IRGACURE™ 651 photoinitiator, 0.8 parts of IOTG, and 0.4 part of octadecyl-3-(3,5-di-tert-butyl-4-hydroxyphenyl)proprionate (IRGANOX™ 1076 available from Ciba Specialty Chemicals Corp.) was added. A total energy of about 4107 mJ per sq cm was used. The resulting polymer had a $M_W$ of about $5.54 \times 10^4$ and a $M_n$ of about $2.84 \times 10^4$.

PSA-4—A PSA composition was prepared according to the procedure for PSA-3 except 0.3 parts of IOTG was used. A total energy of about 4107 mJ per sq cm was used. The resulting polymer had a $M_W$ of about $1.28 \times 10^5$ and a $M_n$ of about $5.15 \times 10^4$.

PSA-5—A PSA was prepared according to the procedure for PSA-3 except that 85 parts of 2-EHA and 15 parts of AA were used and the total energy used was 1785 mJ per sq cm. The resulting polymer had a $M_w$ of about $4.72 \times 10^4$ and a $M_n$ of about $2.84 \times 10^4$.

PSA-6—A PSA was prepared according to the procedure for PSA-5 except that 0.3 part of IOTG was used, and the total energy was about 1778 mJ per sq cm. The resulting polymer had a $M_w$ of about $8.86 \times 10^4$ and a $M_n$ of about $5.72 \times 10^4$ PSA-7—A PSA was prepared according to the procedure for PSA-3 except that 80 parts of 2-EHA and 20 parts of AA were used and the total energy used was 1778 mJ per sq cm. The resulting polymer had a $M_w$ of about $3.94 \times 10^4$ and a $M_n$ of about $2.54 \times 10^4$.

PSA-8—A PSA was prepared according to the procedure for PSA 5 except that 90 parts of 2-EHA, 10 parts of AA, and 0.03 part of IOTG were used. The total energy used was about 1530 mJ per square cm. The resulting polymer had a $M_w$ of about $5.75 \times 10^5$ and a $M_n$ of about $1.98 \times 10^5$.

Skin Adhesive-1 (SA-1)

Skin Adhesive-1 was prepared by feeding about 12.7 parts of a thermoplastic rubber (KRATON D-1340K, a multi-arm block copolymer with about 9% styrene, obtained from Kraton Polymers, Inc. (Houston Tex.), and made according to U.S. Pat. No. 5,393,373, the subject matter of which is hereby incorporated herein in its entirety) from a K-tron™ weight loss feeder into Zone 1 of a 40 mm Berstorff twin screw extruder having 10 heated zones set at 120° C. The screw had conveying sections in zones 1, 4, 8, 9, and 10, and mixing sections in the later portions of Zones 2, 3, 5, 6, and 7. Other components were fed into different zones of the extruder using the feed equipment and temperatures as follows (all amounts are approximate as there are variations in the feeding devices, speed, etc.):

Zone 2: 6.2 parts of 2-ethylhexyl diphenyl phosphate plasticizer (SANTICIZER 141 available from Ferro Co. (Bridgeport, N.J.))—Zenith pump/hose with temperatures set at room temperature.

Zone 3: 23.2 parts of an aliphatic C-5 tackifying resin (EXCOREZ 1310LC available from ExxonMobil Chemical LTD. (Southampton, Hampshire, GB))—grid melter/melt pump/hose with temperatures set at 160° C.

Zone 4: 0.38 parts of black pigment having a 50/50 blend of carbon black in ethylene vinyl acetate copolymer resin having a melt index of about 150 (4900 CMB available from MA Hanna Color (Suwanee, Ga.)) fed from a disc doser.

Zone 5: 53.1 parts of PSA-1-51 mm Bonnot single screw extruder/melt pump/hose with temperatures set at 150° C.

Zone 6: 3.8 parts of a stabilized rosin acid ester tackifying resin (Superester W-115 available from Arakawa Chemical USA (Chicago, Ill.)) mixed with 0.26 parts of pentaerythritoltetrakis(3-(3,5-di-tert-butyl-4-hydroxyphenyl)proprionate (IRGANOX 1010 antioxidant available from Ciba Specialty Chemical Co.), and 0.26 parts of 2-(2-hydroxy-3,5-di-(tert)-amylphenyl)benzotriazole (TINUVIN 328 ultraviolet light absorber available from Ciba Special Chemicals Co.)—grid melter/melt pump/hose with temperatures set at 160° C. The compounded adhesive was collected in a box lined with silicone release agent.

Skin Adhesive-2 (SA-2)

SA-2 was prepared according to the procedure for SA-1 except that 11.5 parts of thermoplastic rubber (KRATON D-1340K), 20 parts of ESCOREZ 1310LC tackifier, 55.6 parts of PSA-1, 6 parts of Superester W-115 tackifier, and 3 parts of SANTICIZER 141 plasticizer were used.

Example 1

A foam core composition was prepared by feeding 97.7 parts of PSA-3 into zone 1 of a 40 mm Berstorff twin screw extruder having conveying sections in zones 1, 4, 8, and 9, and mixing sections in the later portions of zones 2, 3, 5, and 6. The extruder had 10 heated zones, each set at 120° C. PSA-2 was fed from a 51 mm single screw extruder (Bonnot) apparatus having a melt pump and hose with temperatures set at 121° C./150° C./150° C. respectively. A K-tron™ T20 feeder was used to add 2.3 parts of expandable microspheres having a shell composition containing acrylonitrile and methacrylonitrile and a core of isopentane (DUAL-ITE™ U010-185D expandable microspheres, available from Sovereign Specialty Chemicals Inc. (Avon, Ohio)). The microsphere-containing compounded core was fed through a melt pump and hose, each set at about 150° C., to the center port of a 25.4 cm (10 inch) wide Cloeren three-layer adjustable vane type die with a keyhole shaped manifold set at a temperature of 192° C. The feed rate of the microspheres was adjusted to achieve a particular target density.

A foam tape was prepared by feeding SA-1 (Skin Adhesive-1) at a rate of about 2.63 kg/hour to the outer layer port of the 3-layer Cloeren die from a 51 mm single screw extruder (Bonnot) with a melt pump and hose set at temperatures of 150° C. The die vanes were adjusted to distribute the skin approximately equally to both sides of the die lips. The foam core composition was fed to the center layer at about 11.35 kg/hour. Upon exiting the die, the co-extruded layers were cast onto a silicone release coated casting roll having a diameter of 18 inches and operated at a surface speed of about 1.37 meters/minute. The roll was cooled with water having a temperature of about 12° C. The cooled extrudate was transferred from the casting roll to a 0.117 mm thick silicone coated polyethylene release liner that was transported at the same speed as the casting roll to the end of the web transport line where it was cut into approximately 1.25 meter lengths. Another sheet of the same release liner was hand laminated to each sheet using a hand-held rubber roller to exclude trapped air, and the sheets were stacked. The resulting foam tape had a total thickness of about 1.14 mm as measured with a digital caliper and a density of about 0.61 grams per cubic centimeter (g/cc). The skin adhesive layers on either side of the core had a thickness of 0.076 mm (0.003 inch) and a density of about 0.98 g/cc, and the core had a thickness of about 0.99 mm (0.039 inch) and a density of about 0.98 g/cc. The liners each had a thickness of 0.117 mm (0.0046 inch) and a density of 0.99 g/cc.

Figure 4:
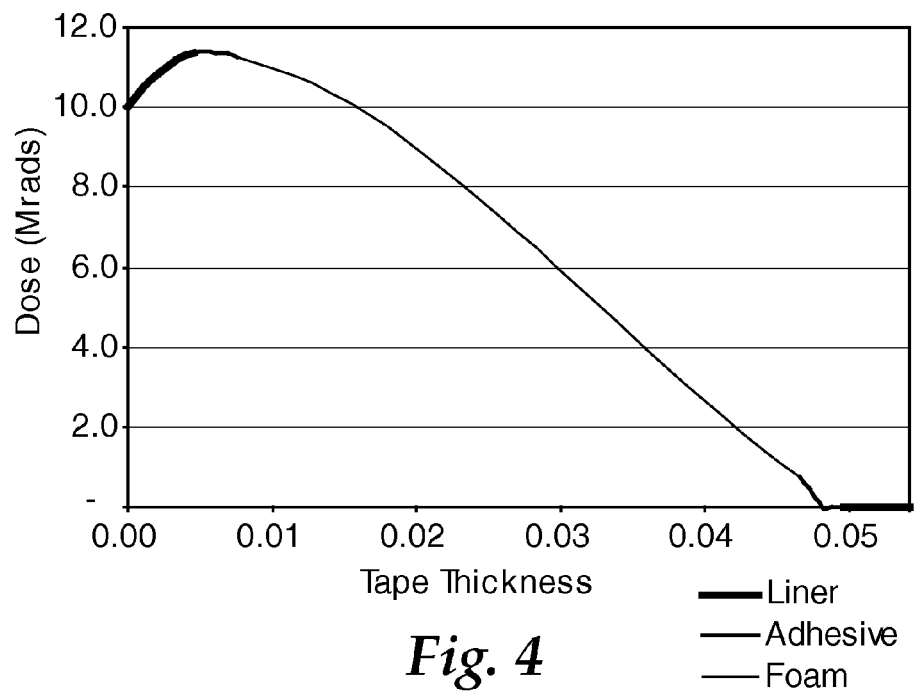
FIG. 4 provides an exemplary graph showing electron beam radiation dose versus tape depth for the sample tape of Example 1 after electron beam radiation exposure to one outer surface.

The tape was irradiated with electron beam radiation at an accelerating voltage of 300 KeV and a dose of 10 megarads from one side of the tape. A plot of dose against tape thickness is shown in FIG. 4. The radiation was not sufficient to crosslink the tape on the side of the tape opposite the E-beam.

Figure 5:
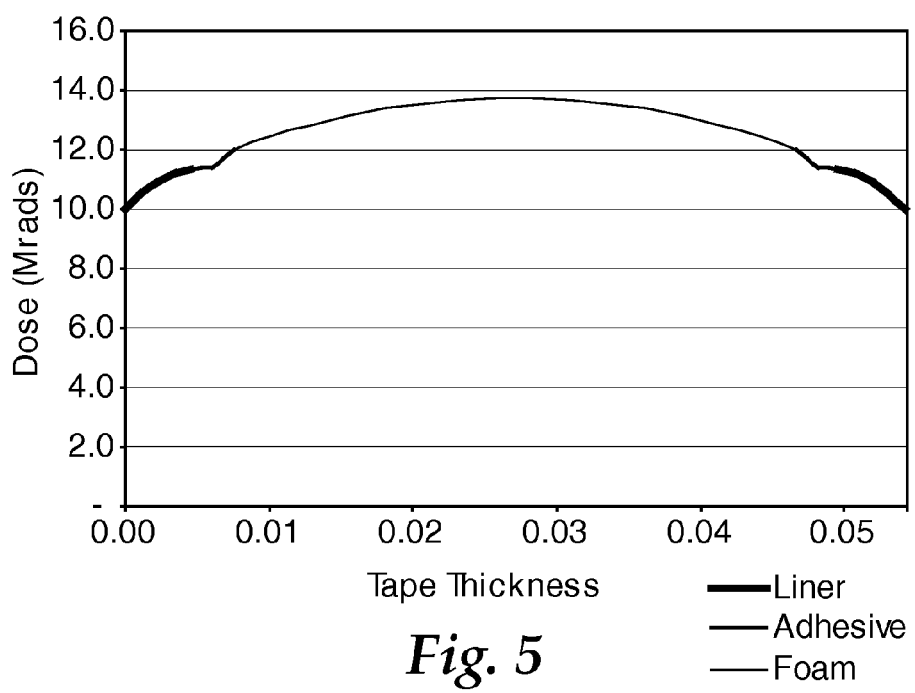
FIG. 5 provides an exemplary graph showing electron beam radiation dose versus tape depth for the sample tape of Example 1 after electron beam radiation exposure to both outer surfaces.

The sample was turned over and a second pass was made through the E-beam apparatus at the same accelerating voltage and dose. The resulting plot is shown in FIG. 5. The additive effect of the radiation in the middle of the tape was greater than at either surface so the resulting plot was a convex curve.

Figure 6:
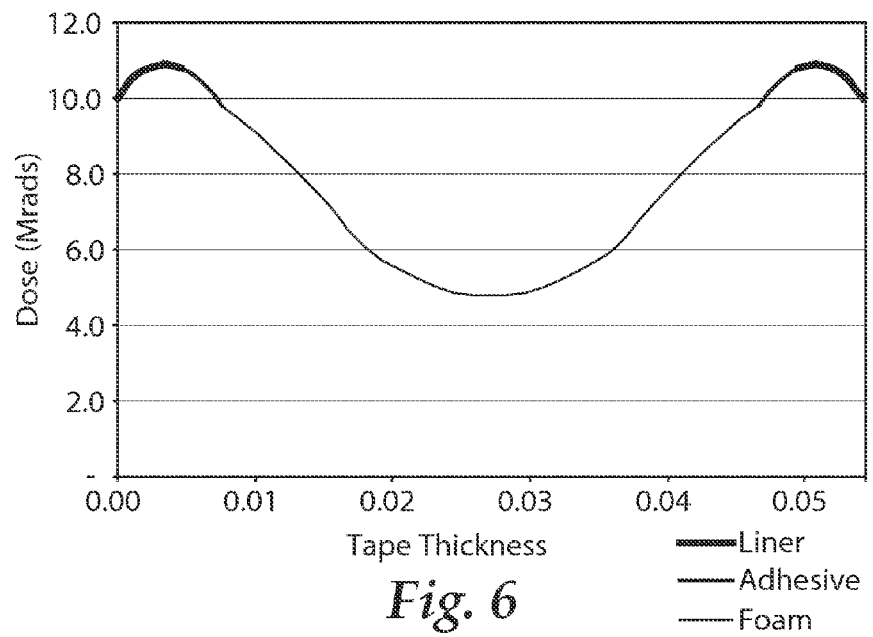
FIG. 6 provides an exemplary graph showing electron beam radiation dose versus tape depth for the sample tape of Example 1 after electron beam radiation exposure to both outer surfaces at a lower accelerating voltage than used in the trial shown in FIG. 5.

The accelerating voltage was lowered to 230 KeV and a second sample of the tape was run through the apparatus twice. The additive effect of the radiation in the middle of the tape was less than at either surface so the resulting plot had a concave downward profile with the minimum within about the central third of the cross section of the tape as shown in FIG. 6. The minimum, that is, the MCCC (Minimum Calculated Core Cure), was correlated to the shear strength and stress relaxation of the sample.

Figure 8:
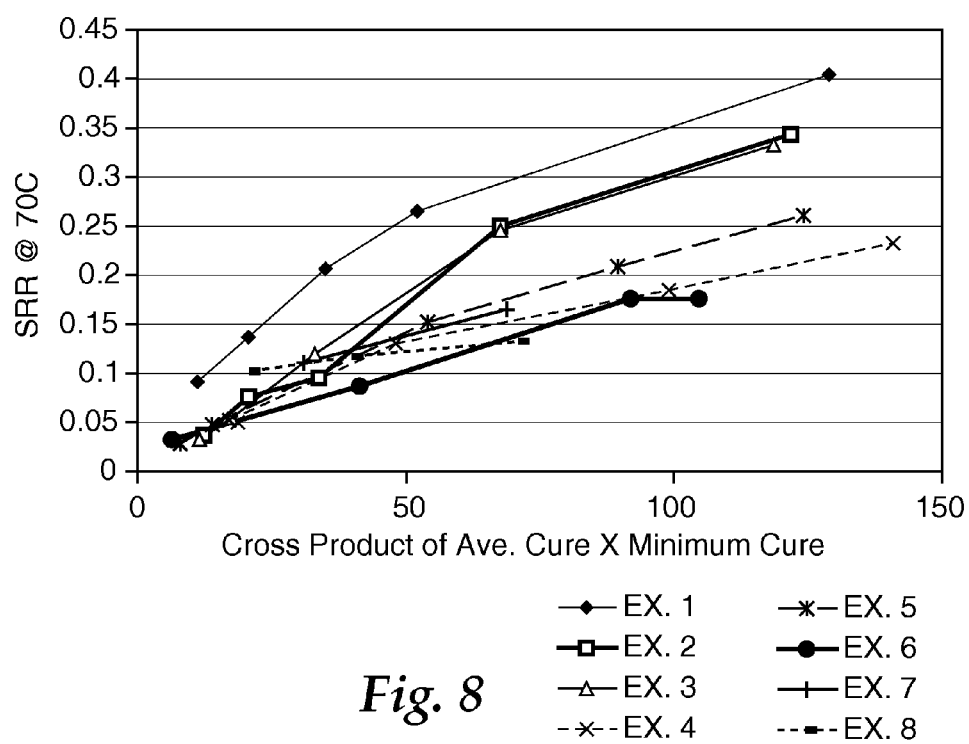
FIG. 8 provides an exemplary graph showing Stress Relaxation at 70° C. versus the product of the Average Calculated Core Cure (ACCC) and the Minimum Calculated Core Cure (MCCC) for sample tapes of Examples 1-8.

Five more samples of the same tape construction were treated with different accelerating voltages and doses as shown in Table 1. The stress relaxation and static shear strength were measured for each process condition and the minimum e-beam cure in the cross section was calculated according to the procedure for determining MCCC. The average cure throughout the thickness of the tape was also calculated. The product of the minimum core cure and the average core cure (Product) was calculated. This product appears to provide a better resolution of the data than just the minimum cure value alone. The stress relaxation values were plotted against the MCCC values for each dose as shown in FIG. 7. The stress relaxation was also plotted against the product of the Average Calculated Core Cure (ACCC) and the Minimum Calculated Core Cure (MCCC) as shown in FIG. 8.

Monte Carlo code was used to help select the accelerating voltage and dose for each sample. This example illustrates an exemplary method of the present disclosure wherein the Minimum Calculated Core Cure is used to adjust the treatment level to meet the performance requirements of a particular tape composition (liner, core, skin adhesives) and density.

Examples 2-8

Foam tapes were prepared according to the procedures described below. Two to five samples of each tape construction were exposed to different electron beam accelerating voltage in KeV and dose in MRads as indicated by the letter after the Example number shown in Table 1. Each sample was exposed to two passes through the apparatus so that both sides of the tape were irradiated. An e-beam dose/depth profile was calibrated for each cured sample according to the procedure described above. The Minimum Calculated Core Cure (MCCC) in megarads was determined as well as the Average Calculated Core Cure (ACCC) in megarads and the Product of the MCCC and the ACCC. Representative samples of the cured tape corresponding to each accelerating voltage and dose were measured for thickness and density, and tested for Shear Strength (SS) and Stress Relaxation Ratio (SRR). Results are shown in Table 1. The Stress Relaxation was plotted as a function of the Minimum Calculated Core Cure as shown in FIG. 7. The Stress Relaxation Ratio (SRR) was also plotted as a function of the Product of the Average Cure (Product) and the Minimum Cure as shown in FIG. 8.

The data shows how the stress relaxation characteristics of tapes having varying compositions can be controlled by the selection of the appropriate dose and accelerating voltage on an electron beam apparatus to provide the desired properties of the adhesive tape. The e-beam conditions were selected to provide a desired shear strength and stress relaxation characteristic so that a process window can be established to make tapes of a given composition, thickness, and density.

Example 2

A foam tape was prepared according to the procedure of Example 1 except as follows. The foam composition was prepared by feeding 84 parts of PSA-2 from the single screw extruder to the twin screw extruder. A similar single screw extruder with temperatures set at 100° C./100° C./120° C. was used to feed 13.7 parts of PSA-3 into zone 2 of the twin screw extruder. The casting roll speed was about 1.25 m/min. The resulting foam tape had a total thickness of about 1.1 mm, and a density of about 0.606 g/cc.

Example 3

A foam tape was prepared according to the procedure of Example 2 except that the single screw extruder was used to feed 13.7 parts of PSA-4 into zone 2 of the twin screw extruder. The casting roll speed was about 1.22 m/min. The resulting foam tape had a total thickness of about 1.16 mm, and a density of about 0.623 g/cc.

Example 4

A foam tape was prepared according to the procedure of Example 2 except that the single screw extruder apparatus temperatures were set at 93° C./107° C./120° C., and about 13.7 parts of PSA-5 were fed into zone 2 of the twin screw extruder. The casting roll speed was about 1.4 m/min. The resulting foam tape had a total thickness of about 1.09 mm, and a density of about 0.623 g/cc.

Example 5

A foam tape was prepared according to the procedure of Example 4 except that about 13.7 parts of PSA-6 were fed into zone 2 of the twin screw extruder. The casting roll speed was about 1.5 m/min. The resulting foam tape had a total thickness of about 1.13 mm, and a density of about 0.637 g/cc.

Example 6

A foam tape was prepared according to the procedure of Example 4 except that about 13.7 parts of PSA-7 were fed into zone 2 of the twin screw extruder. The casting roll speed was about 1.58 m/min. The resulting foam tape had a total thickness of about 1.19 mm, and a density of about 0.635 g/cc.

Example 7

A foam tape was prepared according to the procedure of Example 2 except that about 83.2 parts of PSA-2 were fed into zone 1 of the twin screw extruder, about 13.5 parts of PSA-5 were fed into zone 2, and about 3.3 parts of expandable microspheres were added to zone 8. The casting roll speed was about 1.6 m/min. The resulting foam tape had a total thickness of about 1.10 mm, and a density of about 0.55 g/cc.

Example 8

A foam tape was prepared according to the procedure of Example 4 except that about 83.1 parts of PSA-8 were fed into zone 1 of the twin screw extruder, 15 parts of PSA-5 were fed into zone 2, and 1.9 parts of expandable microspheres were added to zone 8. The casting roll speed was about 1.3 m/min. The resulting foam tape had a total thickness of about 1.14 mm, and a density of about 0.65 g/cc.

TABLE 1

Test Results

| Ex | Voltage-Dose Kev-Mrad | Static Shear | SRR | Thickness mm | Density g/cc | MCCC Mrad | ACCC Mrad | Product Mrad |
|---|---|---|---|---|---|---|---|---|
| 1A | 238-9 | Fail | 0.0906 | 44.8 | 0.6165 | 1.5 | 7.3 | 10.95 |
| 1B | 240-10 | Pass | 0.1375 | 44.58 | 0.6065 | 2.5 | 8.3 | 20.75 |
| 1C | 245-11 | Pass | 0.2073 | 44.77 | 0.6105 | 3.7 | 9.47 | 35.039 |

TABLE 1-continued

Test Results

| Ex | Voltage-Dose Kev-Mrad | Static Shear | SRR | Thickness mm | Density g/cc | MCCC Mrad | ACCC Mrad | Product Mrad |
|---|---|---|---|---|---|---|---|---|
| 1D | 250-11 | Pass | 0.265 | 44.8 | 0.61 | 5.3 | 9.86 | 52.258 |
| 1E | 277-11 | Pass | 0.4046 | 45.7 | 0.6152 | 11 | 11.705 | 128.755 |
| 2A | 238-9 | Fail | 0.0364 | 45.75 | 0.6052 | 1.7 | 7.336 | 12.4712 |
| 2B | 240-10 | Fail | 0.0752 | 44.75 | 0.6046 | 2.5 | 8.3 | 20.75 |
| 2C | 245-11 | Fail | 0.0961 | 46.5 | 0.604 | 3.6 | 9.443 | 33.9948 |
| 2D | 260-11 | Pass | 0.2509 | 47.9 | 0.6089 | 6.5 | 10.38 | 67.47 |
| 2E | 277-11 | Pass | 0.3444 | 47.75 | 0.6033 | 10.5 | 11.58 | 121.59 |
| 3A | 238-9 | Fail | 0.0335 | 45.08 | 0.6213 | 1.6 | 7.309 | 11.6944 |
| 3B | 240-10 | Fail | 0.0541 | 45.25 | 0.6213 | 2.1 | 8.242 | 17.3082 |
| 3C | 245-11 | Fail | 0.119 | 45.48 | 0.6189 | 3.5 | 9.436 | 33.026 |
| 3D | 260-11 | Pass | 0.2454 | 46.52 | 0.625 | 6.5 | 10.392 | 67.548 |
| 3E | 277-11 | Pass | 0.3329 | 46.5 | 0.6264 | 10.3 | 11.524 | 118.6972 |
| 4A | 238-9 | Fail | 0.0500 | 41.52 | 0.62 | 2.5 | 7.42 | 18.55 |
| 4B | 240-10 | Fail | 0.0530 | 44.08 | 0.626 | 2.1 | 8.19 | 17.199 |
| 4C | 250-11 | Pass | 0.1300 | 44.1 | 0.626 | 4.9 | 9.84 | 48.216 |
| 4D | 264-11 | Pass | 0.18434 | 42.5 | 0.623 | 9 | 11 | 99 |
| 4E | 277-11 | Pass | 0.23313 | 42.72 | 0.62 | 11.8 | 11.93 | 140.774 |
| 5A | 238-9 | Fail | 0.0293 | 44.55 | 0.6384 | 1.1 | 7.18 | 7.898 |
| 5B | 240-10 | Fail | 0.0468 | 44.65 | 0.6372 | 1.7 | 8.11 | 13.787 |
| 5C | 258-10 | Pass | 0.15143 | 44.5 | 0.633 | 5.8 | 9.33 | 54.114 |
| 5D | 273-10 | Pass | 0.20871 | 44.1 | 0.6385 | 8.69 | 10.31 | 89.5939 |
| 5E | 277-11 | Pass | 0.2599 | 44.45 | 0.6317 | 10.7 | 11.6 | 124.12 |
| 6A | 240-10 | Fail | 0.0322 | 47.27 | 0.6411 | 0.8 | 7.95 | 6.36 |
| 6B | 258-10 | Fail | 0.08763 | 46.8 | 0.635 | 4.5 | 9.16 | 41.22 |
| 6C | 273-10 | Pass | 0.17505 | 44.05 | 0.6385 | 8.9 | 10.31 | 91.759 |
| 6D | 277-11 | Pass | 0.1767 | 47.07 | 0.6355 | 9.3 | 11.26 | 104.718 |
| 7A | 228-9 | Fail | 0.11017 | 37 | 0.5408 | 4.1 | 7.6 | 31.16 |
| 7B | 236-10 | Pass | 0.16567 | 35.9 | 0.5297 | 7.4 | 9.3 | 68.82 |
| 8A | 250-9 | Pass | 0.10156 | 45.05 | 0.6615 | 2.7 | 7.77 | 20.979 |
| 8B | 260-9 | Pass | 0.11692 | 44.55 | 0.6625 | 4.8 | 8.36 | 40.128 |
| 8C | 278-8.5 | Pass | 0.13335 | 45.5 | 0.6320 | 8 | 8.9 | 71.2 |

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of irradiating an article with an electron beam, said method comprising:
   providing an electron beam source;
   providing an article comprising a layer of a material comprising a blend of
   (i) a first acrylic copolymer resulting from polymerization of one or more monomers A and one or more monomers B, wherein the first acrylic copolymer has a number average molecular weight, $M_n$, ranging from about 150,000 to about 600,000; and
   (ii) a second acrylic copolymer resulting from polymerization of one or more monomers C and one or more monomers D, wherein the second acrylic copolymer has a number average molecular weight, $M_n$, ranging from about 10,000 to about 70,000;
   wherein monomers B and monomers D have at least one reactive group that is capable of hydrogen bonding; the second acrylic copolymer comprises greater than about 10 total parts by weight of the monomers D based a total weight of the second acrylic copolymer; and the total parts by weight of the monomers D in the second acrylic copolymer is greater than the total parts by weight of the monomers B in the first acrylic copolymer;
   preparing dose-depth profile calibration curves for the electron beam source, wherein at least one of the dose-depth calibration curves exhibits a concave downward dose-depth profile;
   selecting a concave downward dose-depth profile of irradiation; and
   irradiating the article comprising the layer material at a voltage and dose according to the selected concave downward dose-depth profile of irradiation, resulting in an irradiated article;
   wherein irradiating according to the selected concave downward dose-depth profile of irradiation exhibits a minimum of irradiation within a middle 80% of a thickness of the article.

2. A method of irradiating an article with an electron beam, said method comprising:
   providing an electron beam source;
   providing an article comprising a layer of a material comprising a blend of
   (i) a first acrylic copolymer resulting from polymerization of one or more monomers A and one or more monomers B, wherein the first acrylic copolymer has a number average molecular weight, $M_n$, ranging from about 150,000 to about 600,000; and
   (ii) a second acrylic copolymer resulting from polymerization of one or more monomers C and one or more monomers D, wherein the second acrylic copolymer has a number average molecular weight, $M_n$, ranging from about 10,000 to about 70,000;
   wherein monomers B and monomers D have at least one reactive group that is capable of hydrogen bonding; the second acrylic copolymer comprises greater than about 10 total parts by weight of the monomers D based a total weight of the second acrylic copolymer; and the total parts by weight of the monomers D in the second acrylic copolymer is greater than the total parts by weight of the monomers B in the first acrylic copolymer;

preparing dose-depth profile calibration curves for the electron beam source, wherein at least one of the dose-depth calibration curves exhibits a concave downward dose-depth profile;

selecting a concave downward dose-depth profile of irradiation; and irradiating the article comprising the layer material at a voltage and dose according to the selected concave downward dose-depth profile of irradiation, resulting in an irradiated article;

wherein irradiating according to the selected concave downward dose-depth profile of irradiation exhibits a minimum of irradiation within a middle 50% of a thickness of the article.

3. A method of irradiating an article with an electron beam, said method comprising:

providing an electron beam source;

providing an article comprising a layer of a material comprising a blend of (i) a first acrylic copolymer resulting from polymerization of one or more monomers A and one or more monomers B, wherein the first acrylic copolymer has a number average molecular weight, $M_n$, ranging from about 150,000 to about 600,000; and (ii) a second acrylic copolymer resulting from polymerization of one or more monomers C and one or more monomers D, wherein the second acrylic copolymer has a number average molecular weight, $M_n$, ranging from about 10,000 to about 70,000;

wherein monomers B and monomers D have at least one reactive group that is capable of hydrogen bonding; the second acrylic copolymer comprises greater than about 10 total parts by weight of the monomers D based a total weight of the second acrylic copolymer; and the total parts by weight of the monomers D in the second acrylic copolymer is greater than the total parts by weight of the monomers B in the first acrylic copolymer;

preparing dose-depth profile calibration curves for the electron beam source, wherein at least one of the dose-depth calibration curves exhibits a concave downward dose-depth profile;

selecting a concave downward dose-depth profile of irradiation; and irradiating the article comprising the layer material at a voltage and dose according to the selected concave downward dose-depth profile of irradiation, resulting in an irradiated article;

wherein the irradiated article exhibits a measured stress-relaxation ratio in a range from about 0.1 to about 0.4.

* * * * *

UNITED STATES PATENT AND TRADEMARK OFFICE
CERTIFICATE OF CORRECTION

PATENT NO. : 9,580,562 B2
APPLICATION NO. : 14/186135
DATED : February 28, 2017
INVENTOR(S) : Michael Daniels et al.

It is certified that error appears in the above-identified patent and that said Letters Patent is hereby corrected as shown below:

In the Specification

Column 4
Line 17, delete "hydroxyarylacryaltes," and insert -- hydroxyarylacrylates, --, therefor.
Line 40, delete "-1propanone" and insert -- -1-propanone --, therefor.
Line 41, delete "DORACURE™" and insert -- DAROCUR™ --, therefor.
Line 43, delete "DORACURE™" and insert -- DAROCUR™ --, therefor.
Line 49, delete "-(methylhio)" and insert -- -(methylthio) --, therefor.

Column 5
Line 18, delete "Permation" and insert -- Permeation --, therefor.

Column 6
Line 44, delete "$M_n$" and insert -- $M_w$ --, therefor.

Column 10
Line 25, delete "(Huerlen," and insert -- (Heerlen, --, therefor.
Line 29, delete "Huerlen," and insert -- Heerlen, --, therefor.

Column 15
Line 52, delete "Permation" and insert -- Permeation --, therefor.
Line 53, delete "Permation" and insert -- Permeation --, therefor.
Line 56, delete "Chromotography" and insert -- Chromatography --, therefor.

Column 18
Line 25 (approx.), delete "Chromotography" and insert -- Chromatography --, therefor.
Line 38, delete "proprionate" and insert -- propionate --, therefor.
Line 57, after "$5.72 \times 10^4$" insert -- . --.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*